May 11, 1948.   J. R. LINDSAY   2,441,497
ELECTRICAL CIRCUIT
Original Filed Aug. 16, 1944

INVENTOR;
JAMES ROBERT LINDSAY,
BY
ATT'Y.

Patented May 11, 1948

2,441,497

UNITED STATES PATENT OFFICE 2,441,497

ELECTRICAL CIRCUIT

James Robert Lindsay, Arlington Heights, Ill., assignor to The Jeffrey Company, a corporation of Ohio Original application August 16, 1944, Serial No. 549,738. Divided and this application July 17, 1945, Serial No. 605,547

4 Claims. (Cl. 318—124)

This invention relates to an electrical circuit, and an object of the invention is to provide an electrical circuit including a vibratory electromagnetic motor energized with three-phase alternating current, one of the phases of which is reversely connected.

Another object of the invention is to provide an electrical circuit for energizing a vibratory electromagnetic motor with mixed alternating and direct current, in which the alternating current is supplied by a three-phase circuit, one of the coils of which is reversely connected.

A further object of the invention is to provide improved electromagnetic motor field construction which is energized from a three-phase source, one of the field coils being reversely connected.

Other objects of the invention will appear hereinafter, the novel features and combinations being set forth in the appended claims.

Figures 1, 1A:
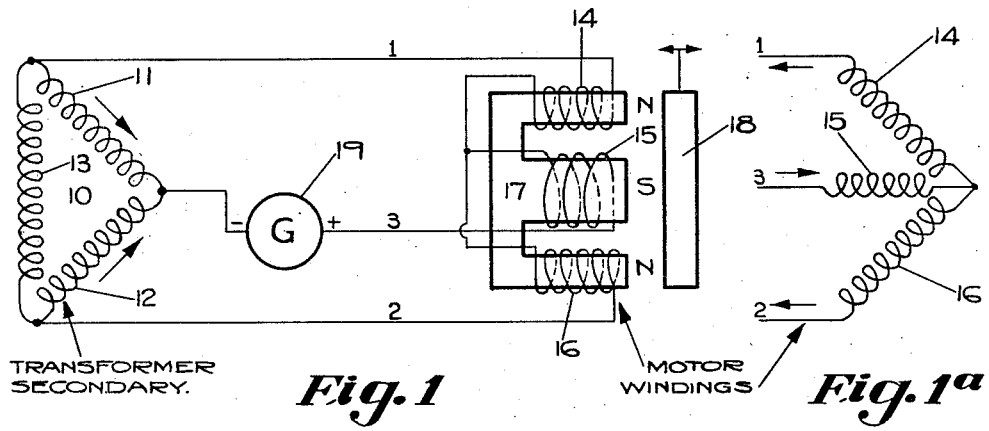
Figure 2:
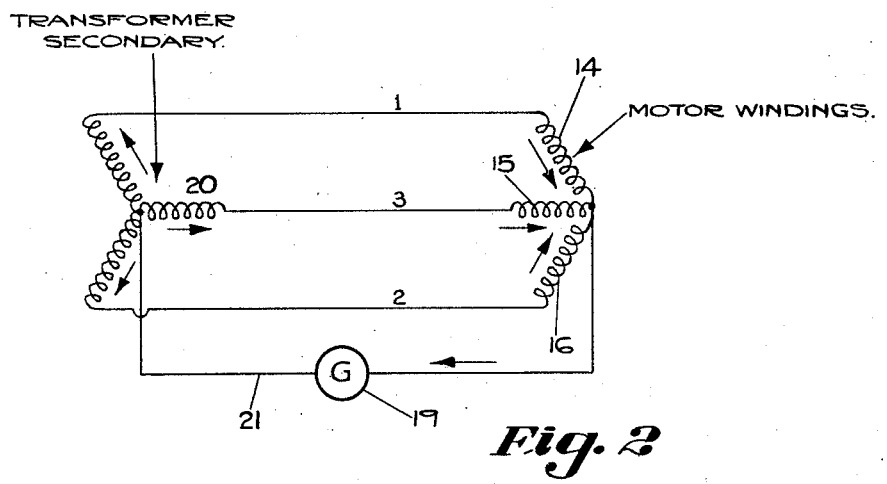

In the accompanying drawings,

Fig. 1 is a wiring diagram of an electrical system employing three-phase current to energize the windings of an electromagnetic motor, the physical or structural relation of the motor windings, field and armature being illustrated;

In Fig. 1ª I have illustrated the motor windings in a manner to suggest the phase relation of the alternating current flowing therethrough; and Fig. 2 of the drawings shows a different electrical circuit energizing a motor winding.

This application is filed as a division of my application Serial No. 549,738, filed August 16, 1944, Patent No. 2,419,686, dated April 29, 1947, for an improvement in an Electrical circuit.

Referring first to Figs. 1 and 1ª of the drawings, the transformer secondary of a three phase transformer is indicated generally at 10 and it constitutes three phase windings 11, 12 and 13 connected in delta, the voltages therein being 120 degrees apart. Three phase conductors designated 1, 2 and 3 extend from the secondary winding 10 to three coils 14, 15 and 16 which are wound on the field core 17 of a vibratory electromagnetic motor having a vibratory armature 18. The windings 14, 15 and 16 are so poled as to give relative instantaneous polarities as indicated by the letters NSN in Fig. 1 of the drawings. Since the two outside poles are at the instant north and the center poles south, it is obvious that the flux through the center pole will be split between the two outside, and consequently it has preferably twice the cross-sectional area as suggested diagrammatically in Fig. 1 of the drawings.

Furthermore, as suggested in Fig. 1ª of the drawings, the windings 14, 15 and 16 are so connected that the currents in them are 60 degrees out of phase. In other words, winding 15 is reversely connected as compared with what it would normally be in a three phase star connection. Still further, the number of turns on the windings 14, 15 and 16 is selected so that windings 14, 15 and 16 have the same number of D. C. ampere turns. To provide this, windings 14 and 16 have the same number of turns and winding 15 will have essentially half their number of turns.

To provide mixed current operation, conductor 3 has connected therein a source of direct current 19 which is preferably of low voltage as compared with the alternating current voltage. For example, it will be 10 to 20 volts, where the alternating current voltage on a winding 11, 12 or 13, will be 110 volts.

The direct current source 19 may be a battery, a direct current generator, or a rectifier. The path of the direct current is indicated by the arrows in Figs. 1 and 1ª of the drawings. It is to be particularly noted that all the direct current from the source 19 flows through winding 15, the direct current then splitting, one-half flowing between the winding or coil 14, the other half between the winding or coil 16. Return flow of the direct current also splits between the windings 11 and 12.

As is well known, this mixed current operation provides vibration of the armature 18 toward and from the pole faces of the field core 17 at the frequency of the alternating current in the secondary of transformer 10. This vibration is caused by the periodic attraction of the pulsating flux in field core 17 and armature 18 which is periodically reduced so that a spring bar or the like pulls the armature 18 away from the field core 17. Such a motor with single phase winding is seen in the patent to James A. Flint, No. 2,153,243, dated April 4, 1939. If straight alternating current operation is desired, the source of direct current 19 is merely omitted and in this case the frequency of vibration of the armature 18 will be twice the frequency of the alternating current.

In Fig. 2 of the drawings I have shown a system in which the transformer secondary 20 is connected in star rather than in delta; the motor windings or coils 14, 15 and 16 being connected the same as before. In this construction, where mixed current operation is desired, the source of direct current 19 is connected between the neutral point of the transformer secondary 20 and the neutral point of the windings or coils 14, 15 and 16 by way of conductor 21.

The difference between the circuits of Figs. 1 and 2 requires a different winding of the coils of the motor for the two systems. That is, in the system of Fig. 1 the direct current in coil 15 splits between coils 14 and 16. Consequently, coil 15 has twice the direct current amperage flow therethrough as compared with coils 14 and 16. In the system of Fig. 2 the direct current flow through the motor windings 14, 15 and 16 is the same since the direct current delivered by source 19 merely splits three ways, as illustrated by the arrows in Fig. 2 of the drawings.

To preserve the desired balance of D. C. ampere turns in the motor winding in the system of Fig. 2, it is evident that each of the coils 14, 15 and 16 will have the same number of turns.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. An electrical motor circuit including a source of three phase current, a vibratory electrical motor energized therefrom including a field structure having pole faces and an armature mounted to vibrate toward and from said pole faces and be periodically attracted by the flux in said field structure, said field structure including three star connected field coils, one energized from each phase, one of said coils being reversely connected so the current therein is 60 degrees from that in the others, and a source of direct current connected to energize all of said coils.

2. An electrical motor circuit including a source of three phase current, and a vibratory electrical motor energized therefrom including a field structure having pole faces and an armature mounted to vibrate toward and from said pole faces and be periodically attracted by the flux in said field structure, said field structure including three star-connected field coils, one energized from each phase, one of said coils being reversely connected so the current therein is 60 degrees from that in the others.

3. An electrical circuit including a source of three phase current, a vibratory electrical motor energized therefrom including three windings, one of said windings being reversely connected so the current therein is 60 degrees from that in the others, and a source of direct current connected to said windings to flow through one of them and then split and flow in parallel through the other two.

4. An electrical circuit including a source of three phase current, a vibratory electrical motor energized therefrom including three windings, and a source of direct current connected to said windings to flow through one of them and then split and flow in parallel through the other two.

JAMES ROBERT LINDSAY.

REFERENCES CITED

The following references are of record in the file of this patent:

UNITED STATES PATENTS

| Number | Name | Date |
|---|---|---|
| 422,855 | VanDepole | Mar. 4, 1890 |
| 429,729 | Marvin | June 10, 1890 |
| 1,647,147 | Roller | Nov. 1, 1927 |
| 2,153,243 | Flint | Apr. 4, 1939 |
| 2,322,754 | Undy | June 29, 1943 |
| 2,419,686 | Lindsay | Apr. 29, 1947 |

FOREIGN PATENTS

| Number | Country | Date |
|---|---|---|
| 473,402 | Germany | Apr. 4, 1939 |